United States Patent [19]

Ootsuka et al.

[11] Patent Number: 5,587,807
[45] Date of Patent: Dec. 24, 1996

[54] APPARATUS FOR PROCESSING DIGITAL VIDEO DATA WITH ERROR CORRECTION PARITY COMPRISING ERROR CONCEALMENT MEANS

[75] Inventors: Takeshi Ootsuka, Kadoma; Masaaki Higashida, Moriguchi, both of Japan

[73] Assignee: Matsushita Electric Industrial Co., Ltd., Osaka, Japan

[21] Appl. No.: 317,793

[22] Filed: Oct. 4, 1994

[30] Foreign Application Priority Data

Oct. 5, 1993 [JP] Japan ................... 5-249030

[51] Int. Cl.$^6$ ........................... H04N 5/76
[52] U.S. Cl. .................. 386/46; 371/2.1; 371/30; 371/48; 386/113
[58] Field of Search ..................... 358/335, 340, 358/336, 310, 327; 360/33.1, 38.1; 348/607, 608; 371/2.1, 48, 30; H04N 5/76, 5/92

[56] References Cited

U.S. PATENT DOCUMENTS

| | | | |
|---|---|---|---|
| 4,680,763 | 7/1987 | Suma et al. | 360/38.1 |
| 4,698,811 | 10/1987 | Eto et al. | 358/340 |
| 4,730,223 | 3/1988 | Ikeda et al. | 358/335 |
| 4,882,732 | 11/1989 | Kaminaga | 371/2.2 |
| 5,023,710 | 6/1991 | Kondo et al. | 358/335 |
| 5,148,272 | 9/1992 | Acampora et al. | 348/390 |

FOREIGN PATENT DOCUMENTS

| | | |
|---|---|---|
| 0323119 | 7/1989 | European Pat. Off. |
| 552049A2 | 7/1993 | European Pat. Off. |
| 2161043 | 2/1986 | United Kingdom |

OTHER PUBLICATIONS

Proposed SMPTE Standard for Television Digital Component Recording–19–mm Type D–1–Helical Data and Control Records, SMPTE Journal Mar. 1992.

Proposed SMPTE Standard for Television Digital Recording–19–mm Type D–2 Composite Format–525/60, SMPTE Journal, Jun. 1993.

SMPTE Standard for Television Digital Recording–19–mm Type D–2 Composite Format–Helical Data and Control Records, SMPTE Journal Dec. 1993.

Peter D. Symes, "Ten–bBit Processing in an 8–Bit Environment," presented at the 130th SMPTE Technical Conference, Paper No. 130–145, pp. 115–117, (Oct. 19, 1988).

*Primary Examiner*—Thai Q. Tran
*Assistant Examiner*—Khol Truong
*Attorney, Agent, or Firm*—McDermott, Will & Emery

[57] ABSTRACT

In an apparatus for processing input N-bit digital video data with an error correction parity, the input N-bit digital video data includes each one sample of higher-order-N-bit data and a plurality of samples of lower-order-(M–N)-bit data, wherein M>N. An error correction circuit corrects an error of input N-bit digital video data, outputs error-corrected N-bit digital video data, and generates an error detection signal representing an error which can not be corrected. Further, a data combining circuit converts the error-corrected N-bit digital video data into M-bit digital video data, and an error classifying circuit classifies the error detection signal into a first error detection signal representing an error of the each one sample of the higher-order-N-bit data and a second error detection signal representing an error of the plurality of samples of the lower-order-(M–N)-bit data. An error concealment circuit performs an error concealment process for the converted M-bit digital video data based on only the first error detection signal.

15 Claims, 14 Drawing Sheets

Data Dividing Circuit 2

Fig.11 Error Classifying Circuit 9

APPARATUS FOR PROCESSING DIGITAL VIDEO DATA WITH ERROR CORRECTION PARITY COMPRISING ERROR CONCEALMENT MEANS

BACKGROUND OF THE INVENTION

1. Field of the Invention

The present invention relates to an apparatus for processing digital video data with an error correction parity, and in particular, to an apparatus for recording and reproducing or transmitting and receiving digital video data with an error correction parity, comprising error concealment means, such as a digital VTR, a digital video data transmitter, a receiver, a transceiver or the like.

2. Description of the Related Art

As video tape recording and reproducing apparatuses (referred to as VTRs hereinafter) each for encoding a video signal into digital video signal, recording the digital video signal onto a magnetic tape and reproducing the recorded digital video signal from the magnetic tape, the following VTRs have been put into practical use:

(a) D1-VTR which uses a component signal as a signal to be recorded;

(b) D2-VTR which uses a composite signal as a signal to be recorded; and (c) D3-VTR.

The details of the D1-VTR are disclosed in, for example, "SMPTE 227M 19-mm type D1 cassette-helical data and control record", SMPTE Journal, March 1992. In the D1-VTR, a video signal is sampled according to the so-called 4:2:2 method, and then the sampled signal is quantized into eight-bit digital video data, which is recorded onto a magnetic tape having a width of ¾ inches. In the 4:2:2 method, the luminance signal is sampled at 13.5 MHz, and the two color difference signals are sampled at 6.75 MHz, respectively.

In the D2-VTR, the composite video signal is sampled at the frequency which is four times the frequency of the subcarrier signal, and then the sampled signal is quantized into eight-bit video data, which is recorded onto a magnetic tape having a width of ¾ inches. However, since the magnetic tape has the width of ¾ inches, the D2-VTR can not be reduced in the size and weight thereof, and this is requested for a camera integrally incorporated type VTR. According to these needs in the markets, the D3-VTR was manufactured as a product. In the D3-VTR, the composite video signal is quantized into eight-bit video data, and the video data is recorded onto a magnetic tape having a width of ½ inches.

In these digital VTRs, an error correction code is made so that one sample obtained by sampling and quantizing an analog video signal so as to convert the same into digital video data of eight bits is used as one symbol of the error correction code. Then, an error concealment process for predicting the contents of an error sample is performed for a sample for which an error correction can not be performed, utilizing a correlation of the video signal.

On the other hand, in order to heighten the quality of image of digital video data used for digital VTRs, a digital VTR has been developed which samples and quantizes input analog video signal so as to convert the same into digital video data of ten bits.

For example, in the U.S. Pat. No. 4,730,223 as issued to Ikeda et al. (referred to as Ikeda et al. hereinafter), digital video data of ten bits obtained by quantizing an input analog video signal so as to convert the same into digital video data of ten bits is divided into higher-order-eight-bit data and lower-order-two-bit data and eight-bit data made of the lower-order-two-bit data in a unit of four pixels is produced. Then the eight-bit data made of the lower-order-two-bit data is arranged before or after one horizontal scanning line of the digital video data, thereby converting input digital video data of ten bits into digital video data of eight bits. The converted digital video data of eight bits is transmitted to a destination station through a communication line.

In Ikeda et al., there is mentioned a method for converting ten-bit digital video data into eight-bit digital video data, however, there is no mention in Ikeda et al. of any concealment process for error samples when an error occurs in a digital video data transmission.

FIG. 14 shows a conventional digital VTR for recording and reproducing digital video data of eight bits converted from input ten-bit-quantized digital video data, which is disclosed in Ikeda et al.

Referring to FIG. 14, the conventional digital VTR comprises an input terminal 1, a first data converting circuit 59, an error correction parity adding circuit 3, a recording processing circuit 4, a recording magnetic head 4a, a reproducing magnetic head 6a, a reproducing processing circuit 6, an error correction circuit 7, a second data converting circuit 60, an error concealment circuit 61, and an output terminal 11.

Ten-bit-quantized digital video data is inputted through the input terminal 1 to the first data converting circuit 59, which converts the input ten-bit digital video data into eight-bit digital video data. This data converting method is as follows. For example, the input ten-bit digital video data is divided into higher-order-eight-bit digital video data and lower-order-two-bit digital video data, and then, eight-bit digital video data made of the lower-order-two-bit digital video data in a unit of four pixels is produced. Thereafter, the eight-bit digital video data made of the lower-order-two-bit digital video data is added as the fifth data after the data made of the higher-order-eight-bit data, and then is inputted to the error correction parity adding circuit 3. In this case, M=10 and N=8. The error correction parity adding circuit 3 adds an error correction parity to the input digital video data, and outputs the digital video data with the error correction parity to the recording processing circuit 4. Then, the recording processing circuit 4 modulates a carrier signal according to the input digital video data using a predetermined modulation method and amplifies the modulated signal, and then outputs the modulated signal to the recording magnetic head 4a, which records the modulated signal outputted from the recording processing circuit 4 onto the magnetic tape 5.

On the other hand, the reproducing magnetic head 6a reproduces the modulated signal recorded on the magnetic tape 5, and the reproducing processing circuit 6 amplifies the modulated signal reproduced by the reproducing magnetic head 6a and demodulates the amplified signal so as to obtain reproduced digital video data, which is outputted to the error correction circuit 7. Then, the error correction circuit 7 performs an error correction process for the digital video data outputted from the reproducing processing circuit 6, and outputs the processed digital video data to the second data converting circuit 60, which performs an inverse process to the data converting process of the first data converting circuit 59, namely, converts the input eight-bit digital video data into ten-bit digital video data and outputs the converted ten-bit digital video data to the error concealment circuit 61. Thereafter, the error concealment circuit 61 performs an error concealment process for error samples using a correlation of the video signal, so as to interpolate a sample corresponding to the error sample, based on the peripheral error samples thereof, and outputs the error-concealed digital video data through the output terminal 11.

However, in the conventional digital VTR shown in FIG. 14, when the error correction of the eight-bit digital video data constituted by the lower-order-two-bits in a unit of four pixels can not be performed, all the four pixels are error-concealed by the error concealment circuit 61. Therefore, only one symbol error influences the digital video data of four pixels. In this case, any error may not occur in the higher-order-eight-bit data of the above-mentioned four pixels, and therefore, as a result of the error concealment process, the quality of image of output digital video data unfortunately deteriorates.

SUMMARY OF THE INVENTION

An essential object of the present invention is therefore to provide an apparatus for processing N-bit digital video data converted from M-bit digital video data, with improvement of the quality of image in an error concealment, wherein M is a natural number, and N is a natural number smaller than the natural number M.

Another object of the present invention is to provide an apparatus for reproducing N-bit digital video data converted from M-bit digital video data from a recording medium, with improvement of the quality of image in an error concealment.

A further object of the present invention is to provide an apparatus for receiving N-bit digital video data converted from M-bit digital video data from a destination station, with improvement of the quality of image in an error concealment.

In order to achieve the aforementioned objective, according to one aspect of the present invention, there is provided an apparatus for processing input N-bit digital video data with an error correction parity, said input N-bit digital video data including each one sample of higher-order-N-bit data and a plurality of samples of lower-order-(M−N)-bit data, M being a predetermined natural number, N being a predetermined natural number smaller than the natural number M, said apparatus comprising:

error correction means for correcting an error of said input N-bit digital video data, outputting error-corrected N-bit digital video data, and generating and outputting an error detection signal representing an error which can not be corrected;

data combining means for converting said error-corrected N-bit digital video data outputted from said error correction means into M-bit digital video data by combining said each one sample of said higher-order-N-bit data and said plurality of samples of said lower-order-(M−N)-bit data included in said error-corrected N-bit digital video data so as to obtain said M-bit digital video data, and outputting converted M-bit digital video data;

error classifying means for classifying said error detection signal into a first error detection signal representing an error of said each one sample of said higher-order-N-bit data and a second error detection signal representing an error of said plurality of samples of said lower-order-(M−N)-bit data; and error concealment means for performing an error concealment process for said converted M-bit digital video data outputted from said data combining means based on said first error detection signal outputted from said error classifying means.

According to another aspect of the present invention, there is provided an apparatus for recording and reproducing digital video data, comprising:

data dividing means for dividing each sample of input M-bit digital video data into high-order-N-bit data and lower-order-(M−N)-bit data, constituting each one sample of said higher-order-N-bit data as one symbol of a predetermined error correction code, constituting a plurality of samples of said lower-order-(M−N)-bit data as one symbol of the error correction code, and outputting N-bit digital video data including said each one sample of the higher-order-N-bit data and said plurality of samples of the lower-order-M−N)-bit data, M being a predetermined natural number, N being a predetermined natural number smaller than the natural number M;

parity adding means for adding an error correction parity to said N-bit digital video data outputted from said data dividing means, and outputting said N-bit digital video data with said error correction parity;

recording means for recording said N-bit digital video data with said error correction parity outputted from said parity adding means, onto a recording medium;

reproducing means for reproducing said N-bit digital video data with said error correction parity recorded on said recording medium;

error correction means for correcting an error of said N-bit digital video data outputted from said reproducing means, outputting error-corrected N-bit digital video data, and generating and outputting an error detection signal representing an error which can not be corrected;

data combining means for converting said error-corrected N-bit digital video data outputted from said error correction means into M-bit digital video data by combining said each one sample of said higher-order-N-bit data and said plurality of samples of said lower-order-(M−N)-bit data included in said error-corrected N-bit digital video data so as to obtain said M-bit digital video data, and outputting converted M-bit digital video data;

error classifying means for classifying said error detection signal into a first error detection signal representing an error of said each one sample of said higher-order-N-bit data and a second error detection signal representing an error of said plurality of samples of said lower-order-(M−N)-bit data; and error concealment means for performing an error concealment process for said converted M-bit digital video data outputted from said data coining means based on said first error detection signal outputted from said error classifying means.

According to a further aspect of the present invention, there is provided an apparatus for reproducing N-bit digital video data with an error correction parity recorded on a recording medium, said N-bit digital video data including each one sample of higher-order-N-bit data and a plurality of samples of lower-order-(M−N)-bit data, M being a predetermined natural number, N being a predetermined natural number smaller than the natural number M, said apparatus comprising:

reproducing means for reproducing said N-bit digital video data with said error correction parity recorded on said recording medium;

error correction means for correcting an error of said N-bit digital video data outputted from said reproducing means, outputting error-corrected N-bit digital video data, and generating and outputting an error detection signal representing an error which can not be corrected;

data combining means for converting said error-corrected N-bit digital video data outputted from said error correction means into M-bit digital video data by combining said each one sample of said higher-order-N-bit data and said plurality of samples of said lower-order-(M–N)-bit data included in said error-corrected N-bit digital video data so as to obtain said M-bit digital video data, and outputting converted M-bit digital video data;

error classifying means for classifying said error detection signal into a first error detection signal representing an error of said each one sample of said higher-order-N-bit data and a second error detection signal representing an error of said plurality of samples of said lower-order-(M–N)-bit data; and error concealment means for performing an error concealment process for said converted M-bit digital video data outputted from said data combining means based on said first error detection signal outputted from said error classifying means.

According to a still further aspect of the present invention, there is provided an apparatus for transmitting and receiving digital video data, comprising:

data dividing means for dividing each sample of input M-bit digital video data into high-order-N-bit data and lower-order-(M–N)-bit data, constituting each one sample of said higher-order-N-bit data as one symbol of a predetermined error correction code, constituting a plurality of samples; of said lower-order-(M–N)-bit data as one symbol of the error correction code, and outputting N-bit digital video data including said each one sample of the higher-order-N-bit data and said plurality of samples of the lower-order-(M–N)-bit data, M being a predetermined natural number, N being a predetermined natural number smaller than the natural number M;

parity adding means for adding an error correction parity to said N-bit digital video data outputted from said data dividing means, and outputting said N-bit digital video data with said error correction parity;

transmitting means for transmitting said N-bit digital video data with said error correction parity outputted from said parity adding means, to a predetermined destination station;

receiving means for receiving said N-bit digital video data with said error correction parity from said destination station;

error correction means for correcting an error of said N-bit digital video data outputted from said receiving means, outputting error-corrected N-bit digital video data, and generating and outputting an error detection signal representing an error which can not be corrected;

data combining means for converting said error-corrected N-bit digital video data outputted from said error correction means into M-bit digital video data by combining said each one sample of said higher-order-N-bit data and said plurality of samples of said lower-order-(M–N)-bit data included in said error-corrected N-bit digital video data so as to obtain said M-bit digital video data, and outputting converted M-bit digital video data;

error classifying means for classifying said error detection signal into a first error detection signal representing an error of said each one sample of said higher-order-N-bit data and a second error detection signal representing an error of said plurality of samples of said lower-order-(M–N)-bit data and error concealment means for performing an error concealment process for said converted M-bit digital video data outputted from said data combining means based on said first error detection signal outputted from said error classifying means.

According to a still more further aspect of the present invention, there is provided an apparatus for receiving N-bit digital video data with an error correction parity from a predetermined destination station, said N-bit digital video data including each one sample of higher-order-N-bit data and a plurality of samples of lower-order-(M–N)-bit data, M being a predetermined natural number, N being a predetermined natural number smaller than the natural number M, said apparatus comprising:

receiving means for receiving said N-bit digital video data with said error correction parity from said destination station;

error correction means for correcting an error of said N-bit digital video data outputted from said receiving means, outputting error-corrected N-bit digital video data, and generating and outputting an error detection signal representing an error which can not be corrected;

data combining means for converting said error-corrected N-bit digital video data outputted from said error correction means into M-bit digital video data by combining said each one sample of said higher-order-N-bit data and said plurality of samples of said lower-order-(M–N)-bit data included in said error-corrected N-bit digital video data so as to obtain said M-bit digital video data, and outputting converted M-bit digital video data;

error classifying means for classifying said error detection signal into a first error detection signal representing an error of said each one sample of said higher-order-N-bit data and a second error detection signal representing an error of said plurality of samples of said lower-order-(M–N)-bit data; and error concealment means for performing an error concealment process for said converted M-bit digital video data outputted from said data combining means based on said first error detection signal outputted from said error classifying means.

In the above-mentioned apparatuses, said error classifying means preferably comprises:

line memory means for storing said error detection signal outputted from said error correction means, said line memory means having a memory capacity for storing said error detection signal of two horizontal scanning line;

write memory control means for controlling said line memory means so as to write said error detection signal representing an error of said high-order-N-bit data into said line memory means;

read memory control means for controlling said line memory means so as to read out and output said error detection signal as said first error detection signal.

In the above-mentioned apparatuses, said natural number N is preferably a multiple of a natural number (M–N).

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

The preferred embodiments according to the present invention will be described below with reference to the attached drawings.

Figure 1:
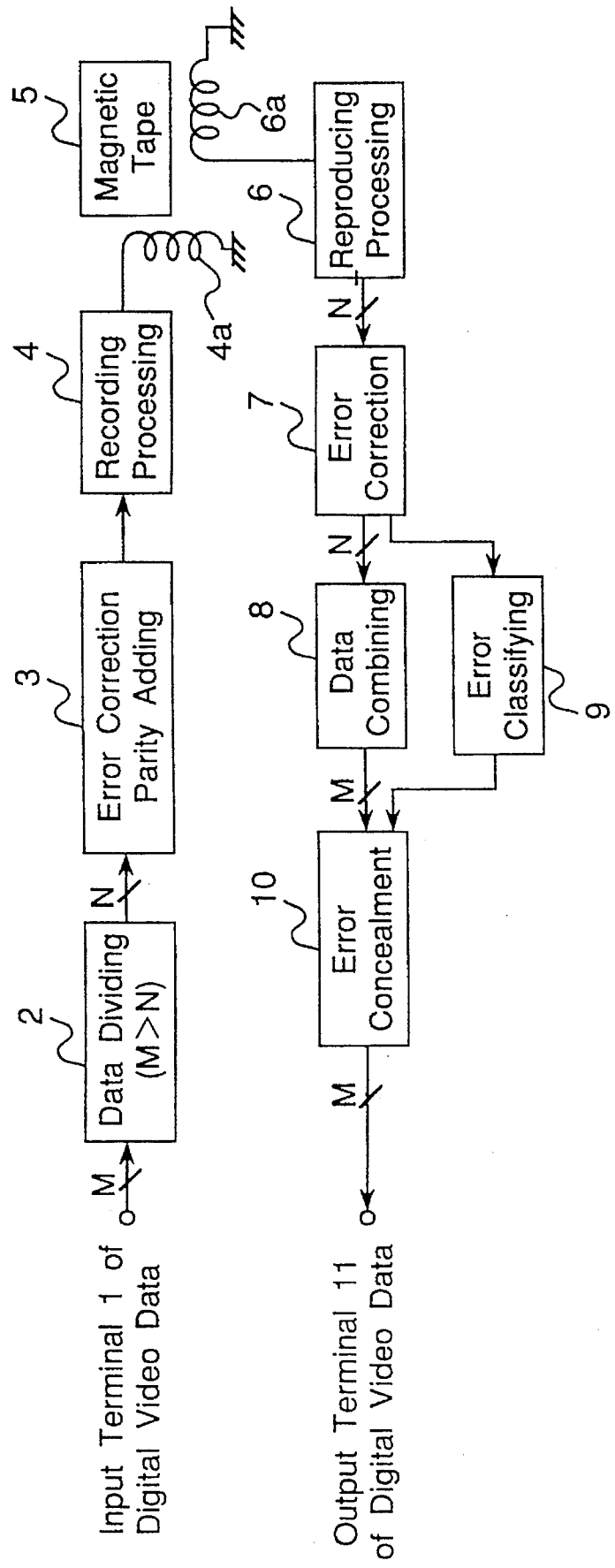
FIG. 1 is a schematic block diagram of a digital VTR for recording and reproducing digital video data according to a preferred embodiment of the present invention.

FIG. 1 shows a digital VTR for recording and reproducing digital video data according to a preferred embodiment of the present invention. In the present preferred embodiment, an analog video signal includes a luminance signal Y and two color difference signals Cr and Cb. The luminance signal Y of one horizontal scanning line is sampled at a sampling frequency of 13.5 MHz, and the sampled luminance signal of 720 samples per one horizontal scanning line is quantized so as to be converted into ten-bit digital luminance data Y'. On the other hand, each of the color difference signals Cr and Cb is sampled at a sampling frequency of 6.75 MHz, and the sampled color difference signal of 360 samples per one horizontal scanning line is quantized so as to be converted into ten-bit color difference data Cr' and Cb'. Thereafter, a ten-bit digital video data is obtained by combining the tuminance data Y', and two the color difference data Cr' and Cb', for example, in series in an order of Cb', Y, Cr and Y, and the obtained ten-bit digital video data is inputted to the digital VTR according to the present preferred embodiment, and is outputted therefrom.

Referring to FIG. 1, the digital VTR according to the present preferred embodiment of the present invention comprises:

(a) an input terminal 1 for inputting ten-bit-quantized digital video data;

(b) a data dividing circuit 2 for dividing the input ten-bit digital video data inputted through the input terminal 1 into higher-order-eight-bit data and lower-order-two-bit data, constituting or setting one-word eight-bit data as they are based on the higher-order-eight-bit data, constituting or setting the other one-word eight-bit data by collecting or combining four samples of the lower-order-two-bit data, and outputting ten-bit digital video data after combining these one-word eight-bit data;

(c) an error correction parity adding circuit 3 for adding inner and outer error correction parities to the ten-bit digital video data outputted from the data dividing circuit 2;

(d) a recording processing circuit 4 for modulating a carrier signal according to the digital video data outputted from the error correction parity adding circuit 3, using a so-called (8-14) modulation method which is known to those skilled in the art, and amplifying and outputting the modulated signal;

(e) a recording magnetic head 4a for recording the modulated signal from the recording processing circuit 4 onto a magnetic tape 5;

(f) a reproducing magnetic head 6a for reproducing the modulated signal recorded on the magnetic tape 5;

(g) a reproducing processing circuit 6 for demodulating the reproduced modulated signal so as to convert the same into reproduced ten-bit digital video data;

(h) an error correction circuit 7 for correcting an error of the ten-bit digital video data, detecting an error of eight-bit digital video data whose error can not corrected, and generating and outputting an error detection signal based on the error detection;

(i) a data combining circuit 8 for combining the digital video data constituted by the higher-order-eight-bit data and the other digital video data constituted by the lower-order-two-bit data so as to recover ten-bit sample digital video data;

(j) an error classifying circuit 9 for classifying the error detection signal representing each error of the digital video data, into a first error detection signal representing an error of the higher-order-eight-bit data and a second error detection signal representing an error of the lower-order-two-bit data based on the error detection signal outputted from the error correction circuit 7;

(k) an error concealment circuit 10 for performing an error concealment process for the ten-bit digital video data outputted from the data combining circuit 8 based on only the first error detection signal, so as to conceal an error symbol of the position represented by the above-mentioned first error detection signal; and (l) an output terminal 11 for outputting the error-concealed ten-bit digital video data outputted from the error concealment circuit 10.

In the present preferred embodiment, M=10, and N=8.

In particular, the digital VTR of the present preferred embodiment is characterized in comprising the data dividing circuit 2, the data combining circuit 8, the error classifying circuit 9, and the error concealment circuit 10.

In the present preferred embodiment, an analog video signal is sampled using a clock having a sampling frequency of 13.5 MHz, and the sampled video signal is quantized so as to converted into ten-bit digital video data of 720 samples per one horizontal scanning line, which is recorded onto a magnetic tape 5 and is reproduced from the magnetic tape 5.

Ten-bit-quantized digital video data is inputted through the input terminal 1 to the data dividing circuit 2, which converts input ten-bit digital video data of 720 samples per one horizontal scanning line having a sampling frequency of 13.5 MHz and having a number of quantizing bits of ten, into eight-bit digital video data of 960 bytes or words per one horizontal scanning line having a sampling frequency of 18.0 MHz. Since the ratio of a frequency of 13.5 MHz to a frequency of 18.0 MHz is 3:4, the number of clocks per one horizontal scanning line becomes 720 in the sampling frequency of 13.5 MHz, whereas the number of clocks per one horizontal scanning line becomes 960 in the sampling frequency of 18.0 MHz.

The breakdown or contents of the digital video data of 960 bytes are as follows:

(a) 720 bytes or words constituted by higher-order-eight-bit digital video data;

(b) 180 (=720·4) bytes or words constituted by lower-order-two-bit digital video data; and (c) remaining 60 bytes or words which are dummy bytes.

Figure 2:
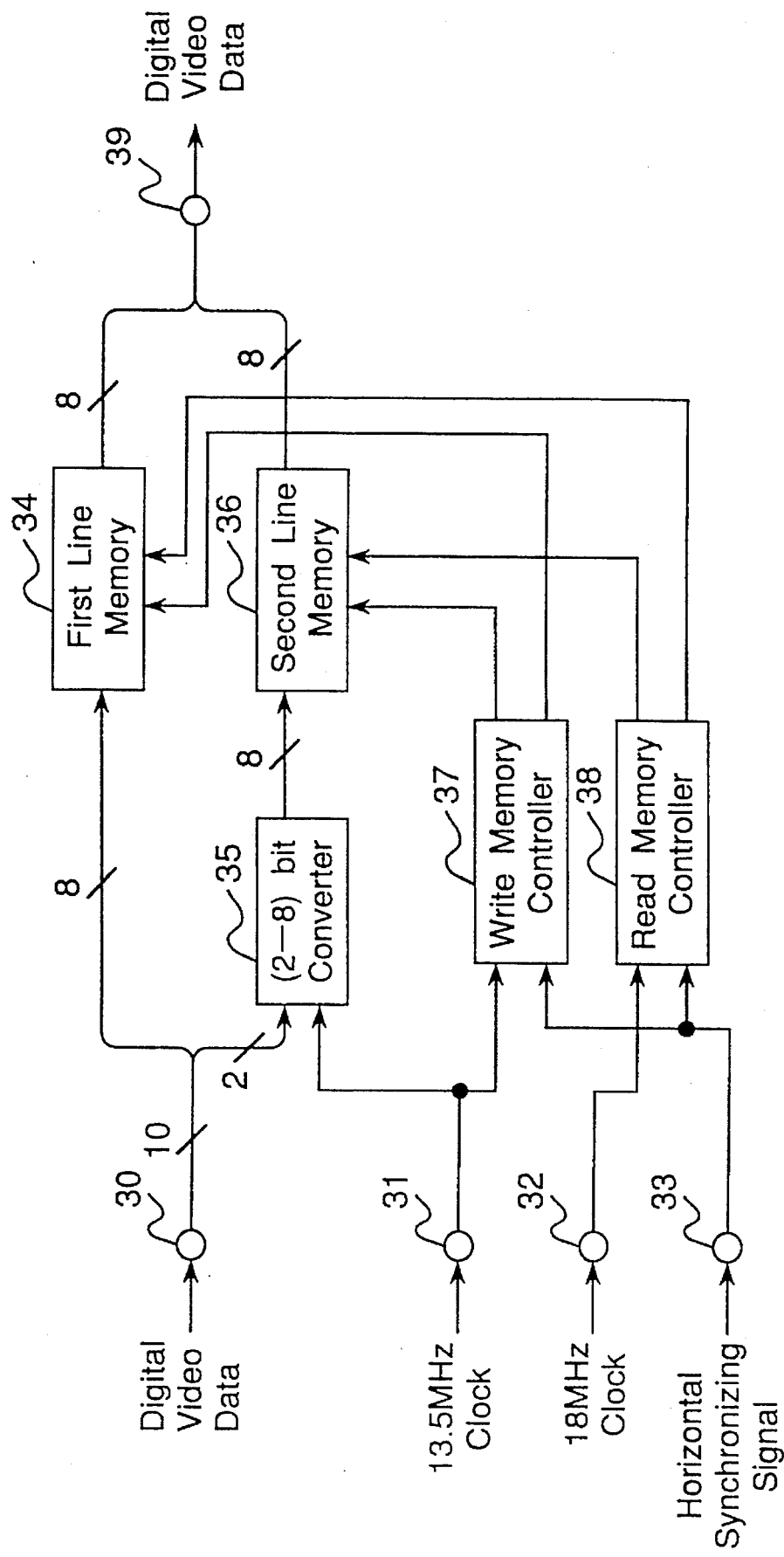
FIG. 2 is a schematic block diagram of a data dividing circuit 2 shown in FIG. 1.

FIG. 2 shows a detailed composition of the data dividing circuit 2 shown in FIG. 1. A composition and operation of the data dividing circuit 2 will be described below with reference to FIG. 2.

Referring to FIG. 2, the data dividing circuit 2 comprises:

(a) an input terminal 30 for inputting input ten-bit digital video data;

(b) an input terminal 31 for inputting a 13.5 MHz clock;

(c) an input terminal 32 for inputting a 18.0 MHz clock;

(d) an input terminal 33 for inputting a horizontal synchronizing signal;

(e) a first line memory 34 for storing the higher-order-eight-bit data therein, the first line memory 34 having a memory capacity capable of storing eight-bit data of two horizontal scanning lines;

(f) a two to eight bit converter (referred to as a (2-8) bit converter hereinafter) 35 for delaying the lower-order-two-bit data by predetermined delay amounts through shift registers, and producing one-byte eight-bit data every four clocks;

(g) a second line memory 36 for storing the eight-bit data of two horizontal scanning lines outputted from the (2-8) bit converter 35, the second line memory 36 having a memory capacity capable of storing eight-bit data of two horizontal scanning lines;

(h) a write memory controller 37 for generating a write clock signal, a write reset signal and a write enable signal based on the 13.5 MHz clock and the horizontal synchronizing signal so as to control a write operation of the first and second line memories 34 and 36;

(i) a read memory controller 38 for generating a read clock signal, a read reset signal and a read enable signal based on the 18.0 MHz clock and the horizontal synchronizing signal so as to control a read operation of the first and second line memories 34 and 36; and (j) an output terminal 39 for outputting eight-bit digital video data outputted from the first and second line memories 34 and 36.

It is to be noted that the 13.5 MHz and 18.0 MHz clocks and the horizontal synchronizing signal are synchronous with the input ten-bit digital video data.

An operation of the data dividing circuit 2 will be described below.

Referring to FIG. 2, ten-bit-quantized digital video data is inputted through the input terminal 30 to the first line memory 34 and the (2-8) bit converter 35.

Figure 3A:
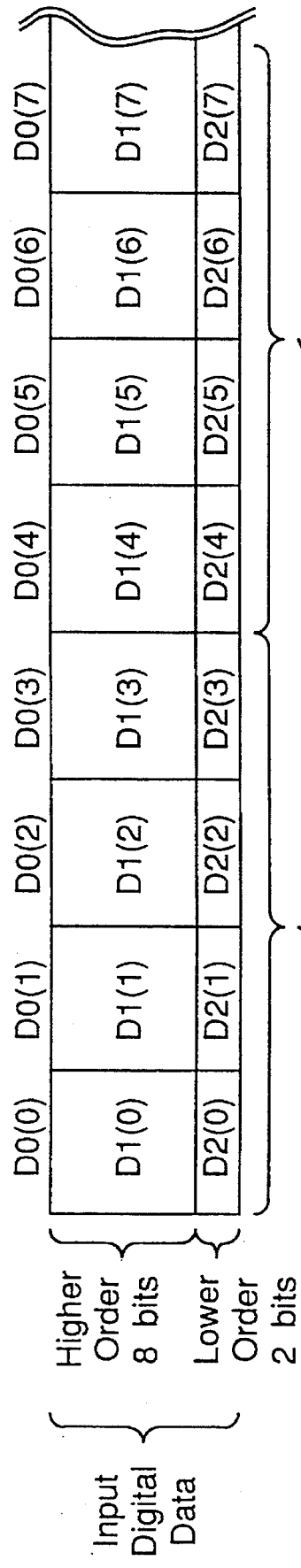
FIG. 3A is a schematic view showing input digital video data inputted to a (2–8) bit converter 35 shown in FIG. 2.
Figure 3B:
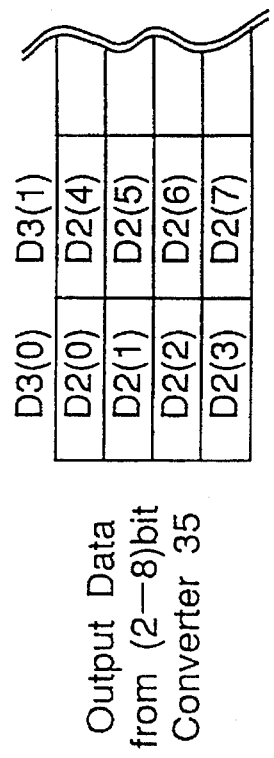
FIG. 3B is a schematic view showing output digital video data outputted from (2–8) bit converter 35 shown in FIG. 2.

FIGS. 3A and 3B are schematic views for explaining an operation of the (2-8) bit converter 35, wherein FIG. 3A shows input digital video data inputted to the (2-8) bit converter 35, and FIG. 3B shows output digital video data outputted from (2-8) bit converter 35.

In FIG. 3A, D0(i) denotes ten-bit-quantized digital video data (referred to as input ten-bit digital video data hereinafter) which is inputted through the input terminal 30, D1(i) denotes higher-order-eight-bit data of the input ten-bit digital video data, and D2(i) denotes lower-order-two-bit data of the input ten-bit digital video data, wherein "i" is an integer equal to or larger than zero. As shown in FIG. 3A, respective samples of the ten-bit digital video data is divided into the higher-order-eight-bit data D1(i) and the lower-order-two-bit data D2(i). The former higher-order-eight-bit data D1(i) is inputted to the first line memory 34 as it is as shown in FIG. 2, whereas the latter lower-order-two-bit data D2(i) is packed, combined or collected every four samples or four two-bit data by the (2-8) bit converter 35 so as to obtain lower-order eight-bit data D3(i) as shown in FIG. 3B. The (2-8) bit converter 35 comprises an eight-bit shift register (not shown), an eight-bit memory (not shown), a latch circuit (not shown), and a memory controller (not shown).

As shown in FIG. 2, the higher-order-eight-bit data D1(i) is inputted to the first line memory 34, and the lower-order eight-bit data D3(i) outputted from the (2-8) bit converter 35 is inputted to the second line memory 36, wherein these eight-bit data D1(i) and D3(i) are written into the first and second line memories 34 and 36, respectively, under a memory control of the write memory controller 37.

Figure 4:
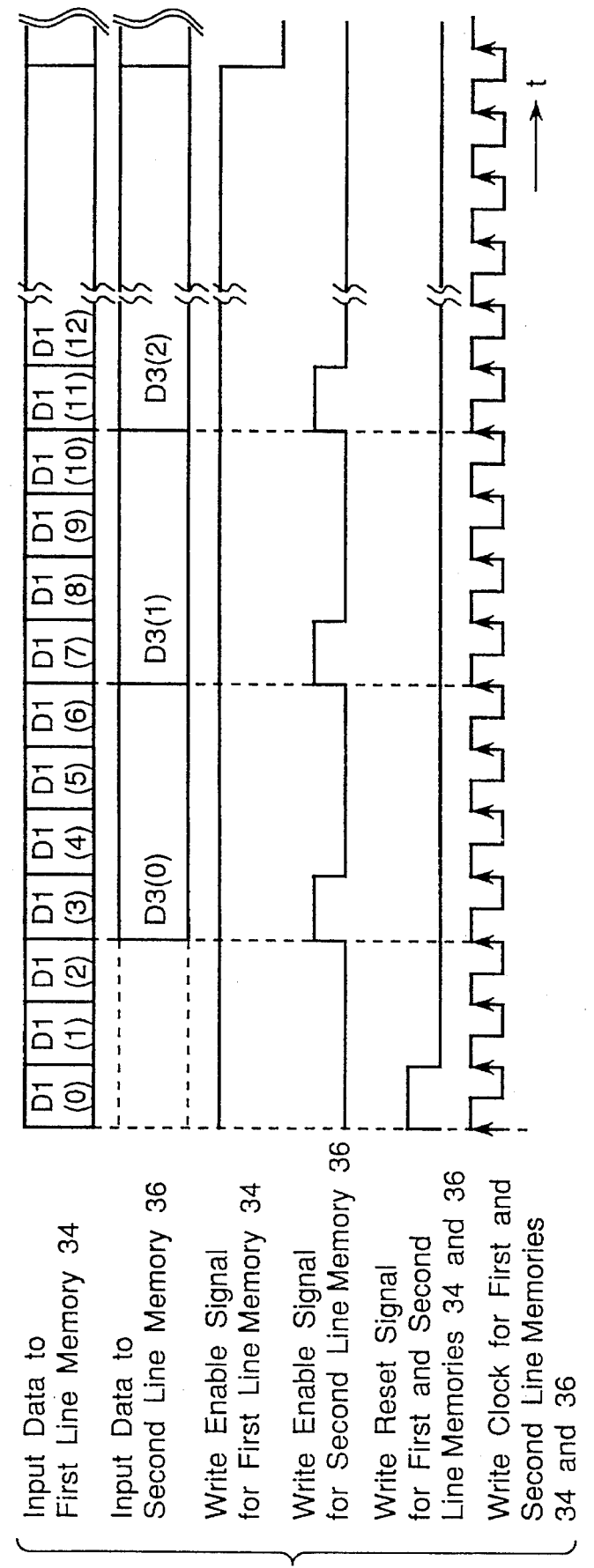
FIG. 4 is a timing chart showing a write operation of digital video data into first and second line memories 34 and 36 shown in FIG. 2.

FIG. 4 is a timing chart showing a write operation of digital video data into first and second line memories 34 and 36 shown in FIG. 2.

Referring to FIG. 4, the 13.5 MHz clock inputted through the input terminal 31 is inputted as the write clock signal to the first and second line memories 34 and 36. The higher-order-eight-bit data D1(i) is written into the first line memory 34 every one clock of the write clock signal since the write enable signal for the first line memory 34 is set to a high level, continuously. Since the write enable signal for the second line memory 36 is set to the high level every four clocks, the lower-order eight-bit data D3(i) is written into the second line memory 36 every four clocks.

Figure 5A:
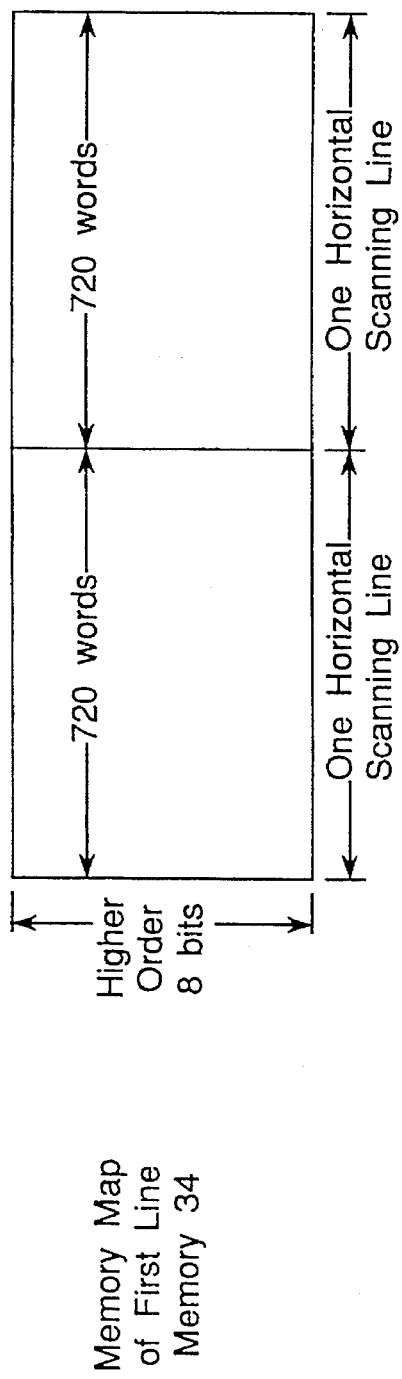
FIG. 5A is a schematic view of a memory map of the first line memory 34 shown in FIG. 2.
Figure 5B:
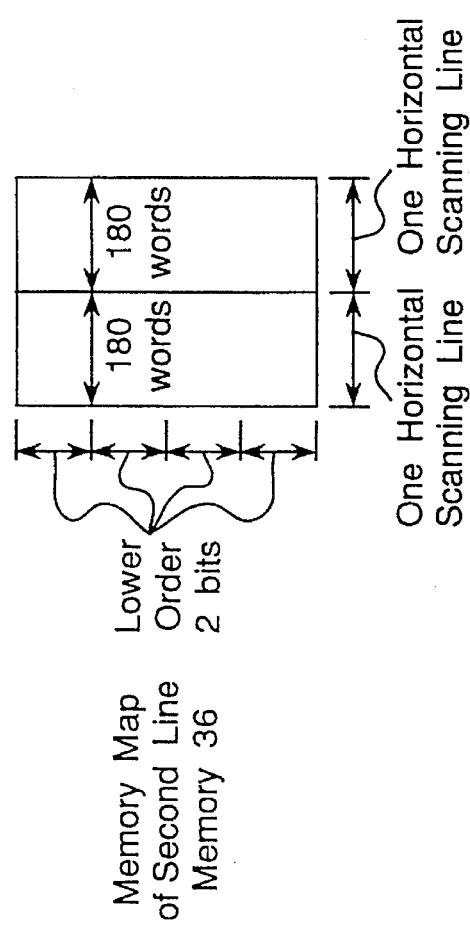
FIG. 5B is a schematic view of a memory map of the second line memory 36 shown in FIG. 2.

FIG. 5A shows a memory map of the first line memory 34, and FIG. 5B shows a memory map of the second line memory 36.

As shown in FIG. 5A, data of 720 words or bytes per one horizontal scanning line is written into the first line memory 34, and each of the two storing area of 720 words is used alternately. On the other hand, as shown in FIG. 5B, data of 180 words or bytes per one horizontal scanning line is written into the second line memory 36, and each of the two storing area of 180 words is used alternately. Further, the read operation of data from the first and second line memories 34 and 36 is performed so that the read memory controller 38 controls the first and second line memories 34 and 36. The read operation of the first and second line memories 34 and 36 is performed after data of one horizontal scanning line is written into the first and second line memories 34 and 36, respectively.

Figure 6:
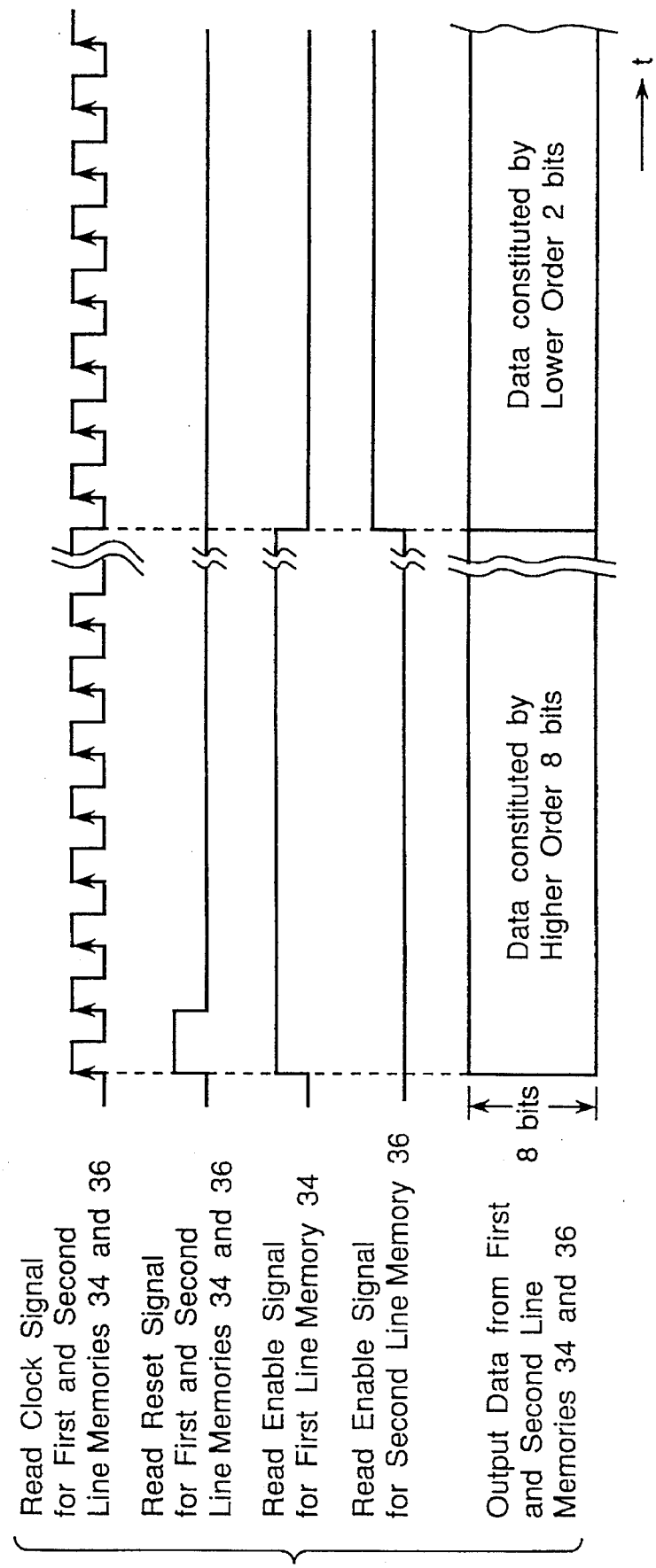
FIG. 6 is a timing chart showing a read operation of digital video data from the first and second line memories 35 and 36 shown in FIG. 2.

FIG. 6 is a timing chart showing a read operation of digital video data from the first and second line memories 35 and 36. The 18.0 MHz clock inputted through the input terminal 32 is inputted as a read clock signal as it is to the first and second line memories 34 and 36, and the read operation of data from the first and second line memories 34 and 36 is controlled using the read enable signals for the first and second line memories 34 and 36, respectively. Since the read operation is performed based on the 18.0 MHz clock, the number of clocks of the effective portion of one horizontal scanning line is 960. In this case, the first 720-clock data of the effective portion of one horizontal scanning line is read out from the first line memory 34, and then the next 180-clock data is read out from the second line memory 36, and the remaining 60-clock data is outputted as dummy data from the output terminal 39.

Referring back to FIG. 2, the eight-bit output data from the data dividing circuit 2 through the output terminal 39 becomes one words or one byte, and then is inputted to the error correction parity adding circuit 3. The error correction parity adding circuit 3 receives the output eight-bit data as one word of a predetermined error correction code, and then adds an outer error correction parity and an inner error correction parity to the input eight-bit data. The output data from the error correction parity adding circuit 3 outputs the input eight-bit data together with the inner and outer error correction parities to the recording processing circuit 4. Thereafter, the recording processing circuit 4 performs a recording process including a modulation, amplification and the like, namely, modulates a carrier signal according to the input data using the predetermined (8-14) modulation method known to those skilled in the art so as to obtain the modulated signal, and amplifies the modulated signal and outputs the same to the recording magnetic head 4a. Then, the modulated signal is recorded onto the magnetic tape 5 through the recording magnetic head 4a.

Next, a reproducing operation of the digital VTR will be described below.

The modulated signal recorded on the magnetic tape 5 is reproduced through the reproducing magnetic head 6a, and then is inputted to the reproducing processing circuit 6, which performs a reproducing process including a demodulation, an amplification and the like so as to obtain the processed eight-bit digital video data, and outputs the processed eight-bit digital video data to the error correction circuit 7. The error correction circuit 7 performs an error correction process on the input digital video data in a unit of one word or one byte based on the inner and outer error correction parities, and then detects an error of a symbol whose error correction is impossible, generating and outputting an error correction signal at a timing of the position of the symbol whose error correction is impossible. The error-corrected digital video data from the error correction circuit 7 is inputted to the data combining circuit 8, whereas the error detection signal from the error correction circuit 7 is inputted to the error classifying circuit 9.

Figure 7:
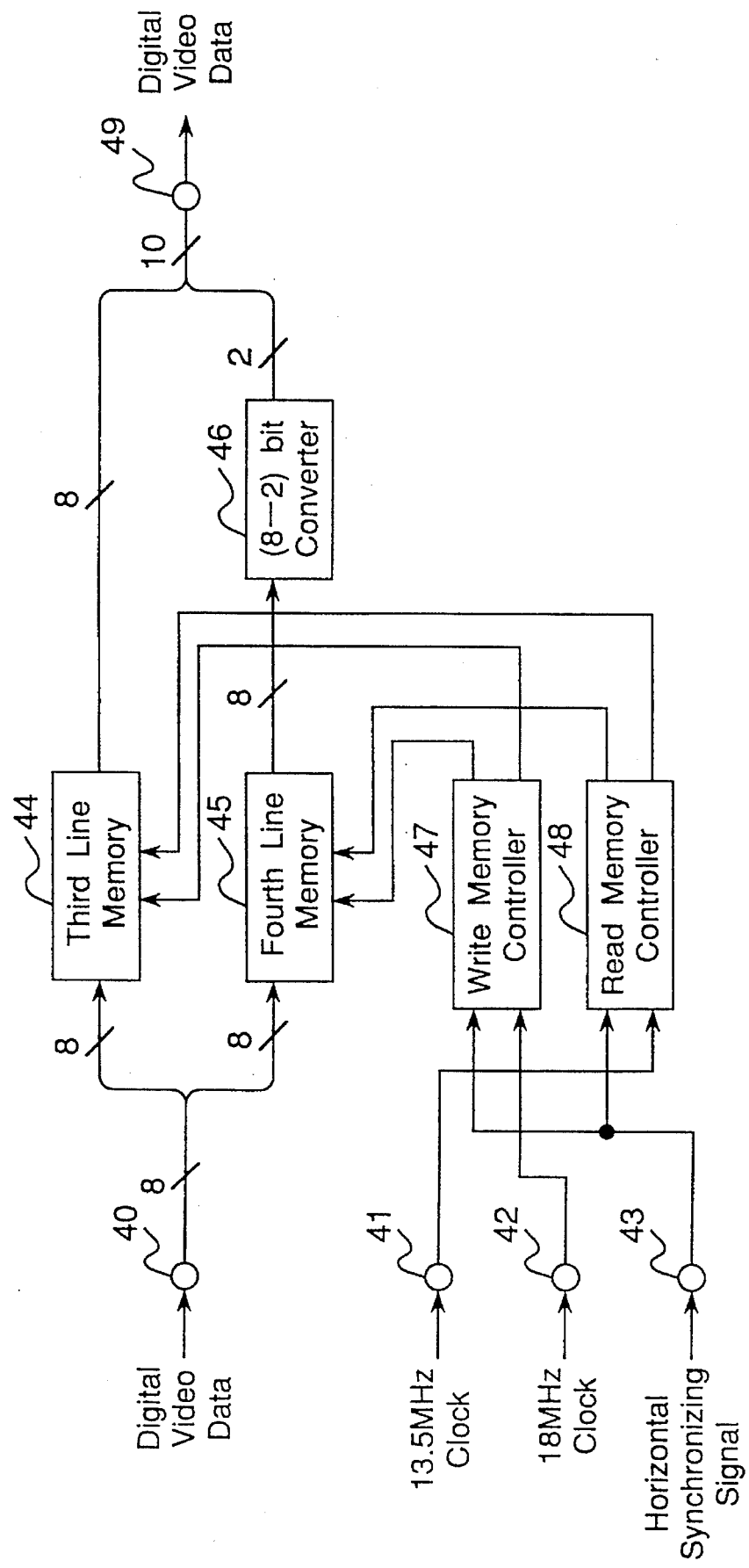
FIG. 7 is a schematic block diagram of a data combining circuit 8 shown in FIG. 1.

FIG. 7 shows the data combining circuit 8. An operation of the data combining circuit 8 will be described below with reference to FIG. 7.

The data combining circuit 8 comprises:

(a) an input terminal 40 for inputting the error-corrected eight-bit digital video data from the error correction circuit 7;

(b) an input terminal 41 for inputting the 13.8 MHz clock;

(c) an input terminal 42 for inputting the 18.0 MHz clock;

(d) an input terminal 43 for inputting the horizontal synchronizing signal;

(e) a third line memory 44 for storing the high-order-eight-bit digital video data D1(i), the third line memory 44 having a memory capacity capable of storing data of two horizontal scanning lines;

(f) a fourth line memory 45 for storing the lower-order eight-bit digital video data D3(i) of two horizontal scanning lines which is made of the combined four lower-order-two-bit data D2(i), the fourth line memory 45 having a memory capacity capable of storing data of two horizontal scanning lines;

(g) an eight to two bit converter (referred to as an (8-2) bit converter hereinafter) 46 for converting the lower-order eight-bit data D3(i) outputted every four clocks from the fourth line memory 45, into two-bit digital video data every one clock;

(h) a write memory controller 47 for generating a write clock signal, a write enable signal and a write reset signal based on the 18.0 MHz clock inputted through the input terminal 42 and the horizontal synchronizing signal inputted through the input terminal 43 so as to control a write operation of the third and fourth line memories 44 and 45, and outputting these signals to the third and fourth line memories 44 and 45;

(i) a read memory controller 48 for generating a read clock signal, a read enable signal and a read reset signal based on the 13.5 MHz clock inputted through the input terminal 41 and the horizontal synchronizing signal inputted through the input terminal 43 so as to control a read operation of the third and fourth line memories 44 and 45, and outputting these signals to the third and fourth line memories 44 and 45; and (j) an output terminal 49 for outputting the output ten-bit digital data which is the output data of the dana combining circuit 8.

An operation of the data combining circuit 8 will be described below with reference to FIG. 7. In the data combining circuit 8, among the one-word eight-bit digital video data of 960 words per one horizontal scanning line inputted through the input terminal 40, the digital video data of 720 words per one horizontal scanning line made of the higher-order-eight-bit data is written into the third line memory 44, whereas the eight-bit digital video data of 180 words constituted by combining the four samples of the lower-order-two-bit data is written into the fourth line memory 45.

Figure 8:
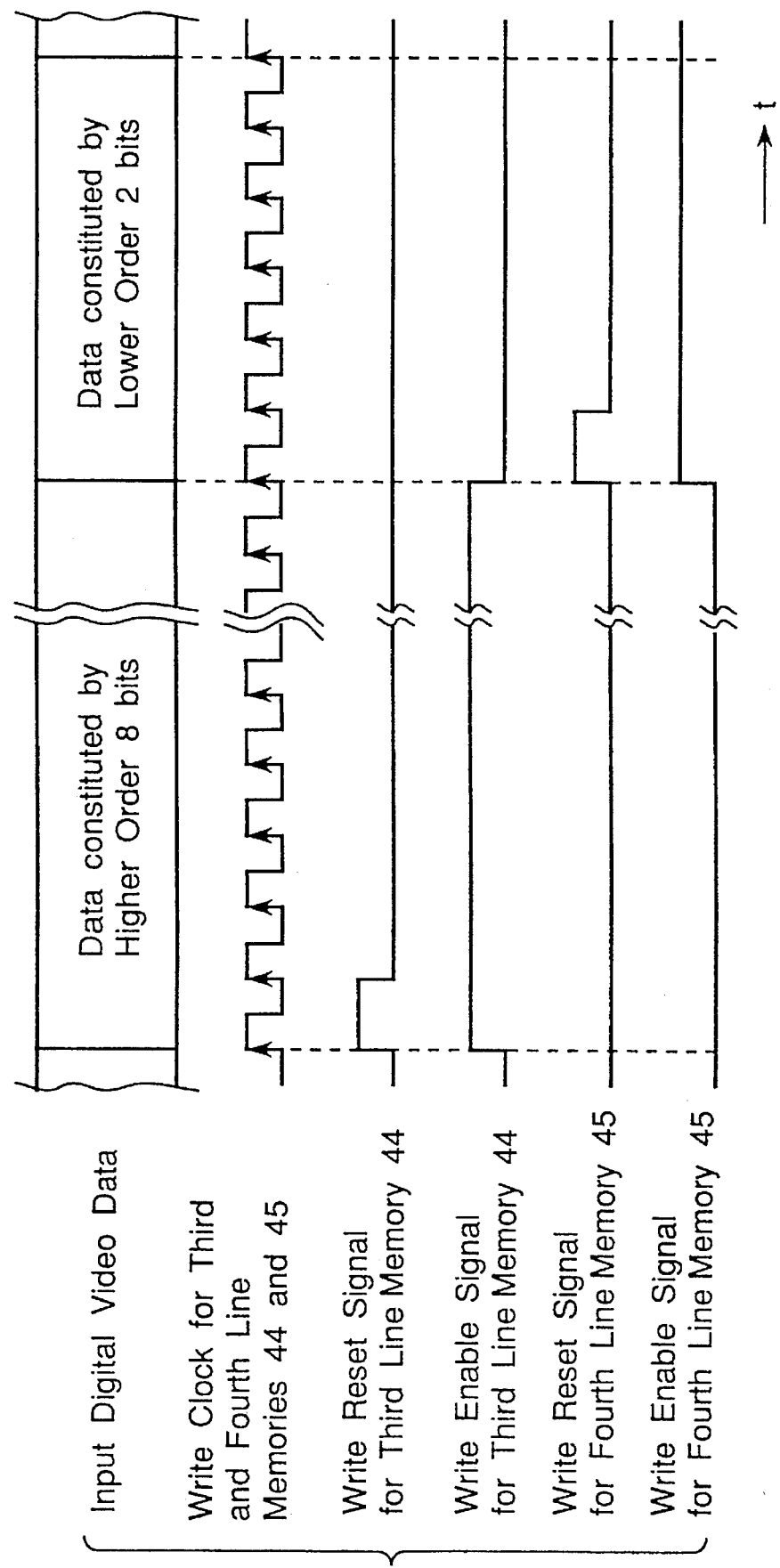
FIG. 8 is a timing charm showing a write operation of digital video data into third and fourth line memories 44 and 45 shown in FIG. 7.

FIG. 8 is a timing chart showing a write operation of digital video data into the third and fourth line memories 44 and 45 shown in FIG. 7.

The 18.0 MHz clock inputted to the third and fourth line memories 44 and 45 through the input terminal 42 is used as a write clock signal as it is, and therefore, the number of clocks of the effective portion of one horizontal scanning line is 960. Data of the first 720 clocks of the effective portion of one horizontal scanning line is written into the third line memory 44, and data of the next 180 clocks thereof is written into the fourth line memory 45. The dummy data of the remaining 60 clocks is not written into the third and fourth line memories 44 and 45.

As shown in FIG. 8, only the eight-bit digital video data constituted by the high-order-eight-bit data is written into the third line memory 44 under a memory control based on the write clock signal, the write reset signal and the write enable signal outputted from the write memory controller 47. On the other hand, only the eight-bit digital video data constituted by combining the four samples of the lower-order-two-bit data is written into the fourth line memory 45 under a memory control based on the write clock signal, the write reset signal and the write enable signal outputted from the write memory controller 47.

As shown in FIG. 8, at a timing of the beginning of the eight-bit data constituted by the high-order-eight-bit data, the write reset signal is inputted to the third line memory 44 for one clock interval, and the write enable signal is inputted to the third line memory 44 for a time interval of the eight-bit data constituted by the high-order-eight-bit data. For this time interval, only the eight-bit data constituted by the high-order-eight-bit data is written into the third line memory 44.

Thereafter, at a timing of the beginning of the eight-bit data constituted by combining the four samples of the lower-order-two-bit data which coincides with the timing of the end of the eight-bit data constituted by the higher-order-eight-bit data, the write reset signal is inputted to the fourth line memory 45 for one clock interval, and the write enable signal is inputted to the fourth line memory 45 for a time interval of the eight-bit data constituted by combining the four samples of the lower-order-two-bit data. For this time interval, only the eight-bit data constituted by combining the four samples of the lower-order-two-bit data is written into the fourth line memory 45.

Figure 9A:
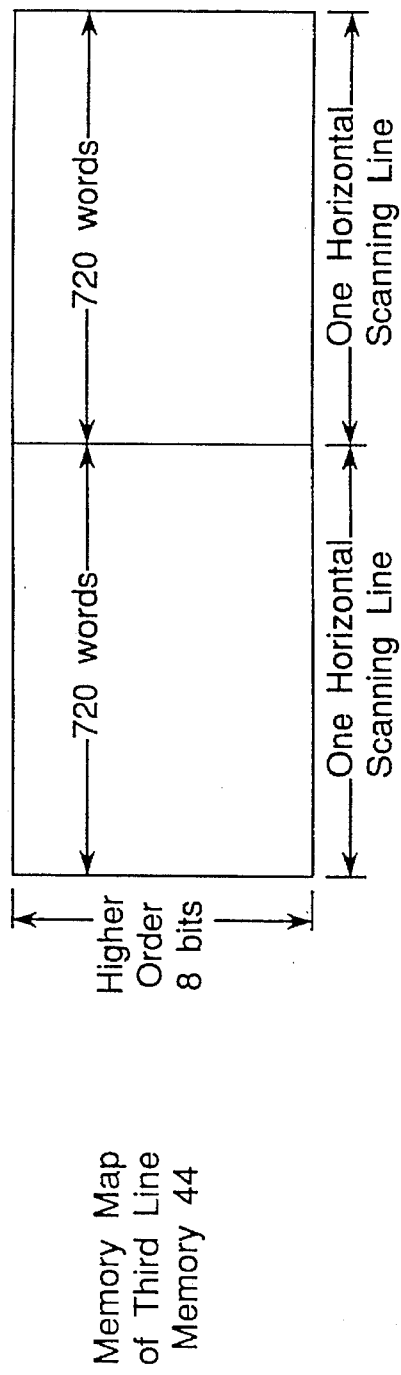
FIG. 9A is a schematic view of a memory map of the third line memory 44 shown in FIG. 7.
Figure 9B:
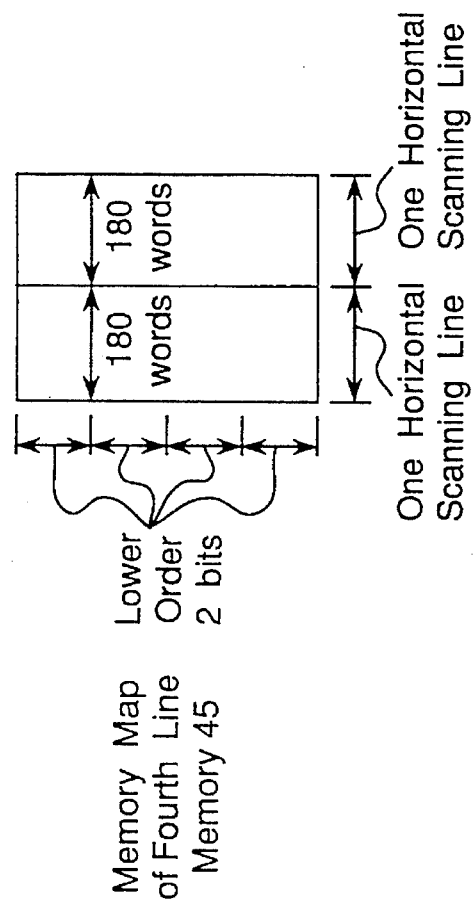
FIG. 9B is a schematic view of a memory map of the fourth line memory 45 shown in FIG. 7.

FIG. 9A shows a memory map of the third line memory 44, and FIG. 9B shows a memory map of the fourth line memory 45.

As shown in FIG. 9A, the one-word eight-bit digital video data of 720 words per one horizontal scanning line constituted by the higher-order-eight-bit data is written into the third line memory 44, whereas the one-word eight-bit digital video data of 180 words per one horizontal scanning line constituted by combining the four samples of the lower-order-two-bit data is written into the fourth line memory 45. Each of the two storing areas of 720 words shown in FIG. 9A is used alternately, and each of the two storing areas of 180 words shown in FIG. 9B is used alternately. Further, the read operation of data from the third and fourth line memories 44 and 45 is performed so that the read memory controller 48 controls the third and fourth line memories 47 and 48. The read operation is performed after digital video data of one horizontal scanning line is written into the third and fourth line memories 44 and 45.

Figure 10:
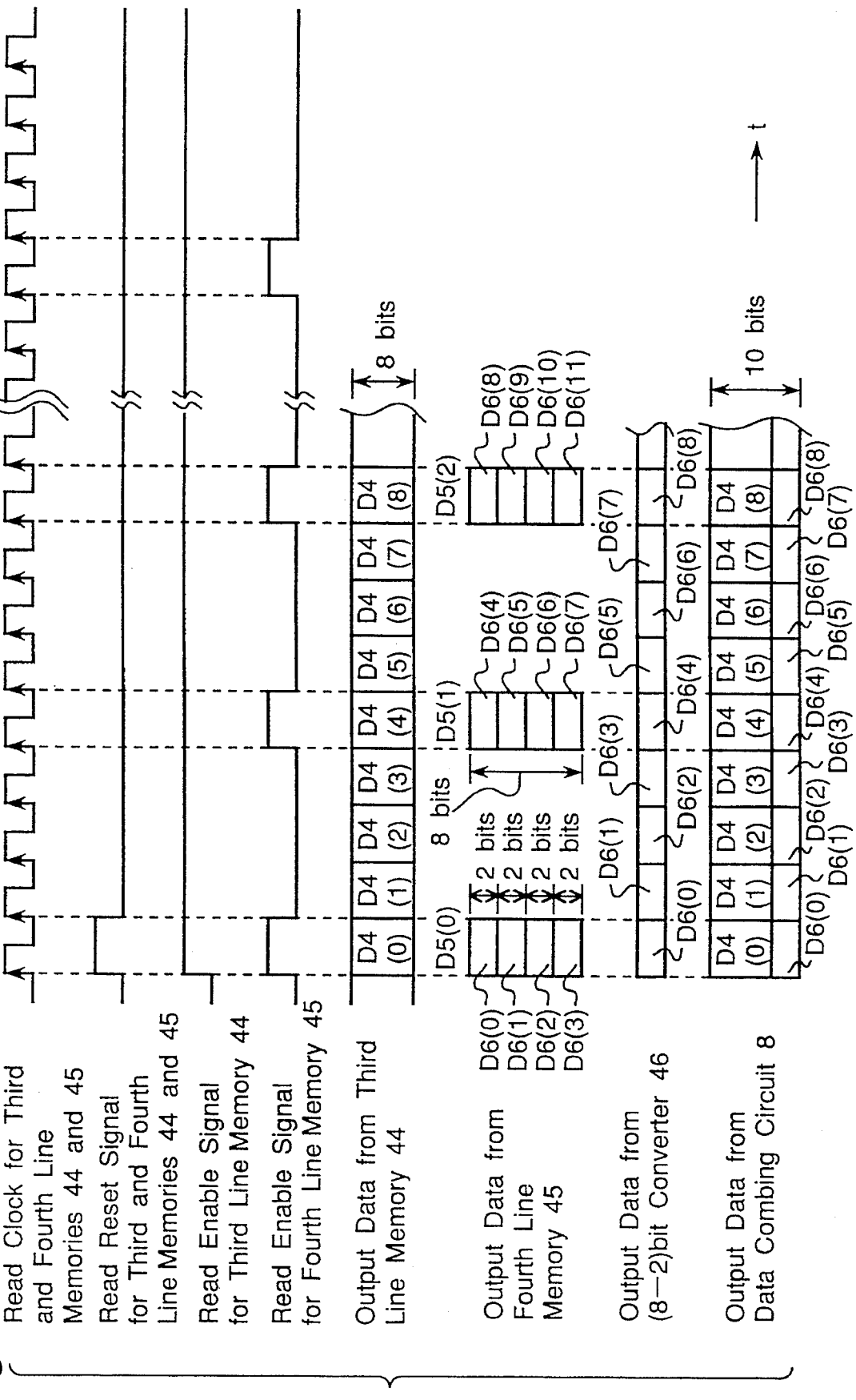
FIG. 10 is a timing chart showing a read operation of digital video data from the third and fourth line memories 44 and 45 shown in FIG. 7.

FIG. 10 is a timing chart showing a read operation of digital video data from the third and fourth line memories 44 and 45 shown in FIG. 7.

As shown in FIG. 10, in the read operation of data from the third and fourth line memories 44 and 45, the 13.5 MHz clock is used as the read clock signal as it is, and the read operation thereof is performed by controlling the read enable signals for the third and fourth line memories 44 and 45. Since the 13.5 MHz clock is used as the read clock signal, the number of clocks of the effective portion of one horizontal scanning line is 720. The 720 samples of the higher-order-eight-bit data of the effective digital video data of one horizontal scanning line is read out from the third line memories 44. The eight-bit data read out from the third line memory 44 is denoted by D4(i), wherein "i" is an integer equal to or larger than zero. On the other hand, the 720 samples of the lower-order-two-bit data of the effective digital video data of one horizontal scanning line is read out every four clocks from the fourth line memory 45 as the 180 samples of the eight-bit digital video data obtained by combining the four samples of the lower-order-two-bit data. The eight-bit digital video data read out from the fourth line memory 45 is denoted by DS(j), wherein "j" is an integer equal to or larger than zero. The lower-order-two-bit digital video data constituting the data D5(j) is denoted by D6(i). The one-word eight-bit digital video data made by collecting or combining the four samples of the lower-order-two-bit data of 180 words per one horizontal scanning line which is read out from the fourth line memory 45 is inputted to (8-2) bit converter 46.

The (8-2) bit converter 46 comprises a shift register (not shown) and delay circuits (not shown). The (8-2) bit converter 46 outputs the first higher-order-two-bit data of the eight-bit digital video data D5(j) read out from the fourth line memory 45 as it is without delaying the same, outputs the third and fourth bits thereof after delaying the same by one clock, outputs the fifth and sixth bits thereof after delaying the same by two clocks, and outputs the last lower-order-two-bit data thereof after delaying the same by three clocks.

As shown in FIG. 10, the two-bit digital video data outputted from the (8-2) bit converter 46 is outputted through the output terminal 49 as the lower-order-two-bit data of the output ten-bit digital video data, whereas the eight-bit digital video data outputted from the third line memory 44 is outputted through the output terminal 49 as the higher-order-eight-bit of the output ten-bit digital video data.

Further, the error detection signal outputted from the error correction circuit 7 is inputted to the error classifying circuit 9, which then classifies the error detection signal into the first detection signal representing an error of the symbol position of data constituted by the high-order-eight-bit data through the data dividing circuit 2, and the second detection signal representing an error of the symbol position of data constituted by the lower-order-two-bit data through the data dividing circuit 2, and outputs the first and second error detection signals.

Figure 11:
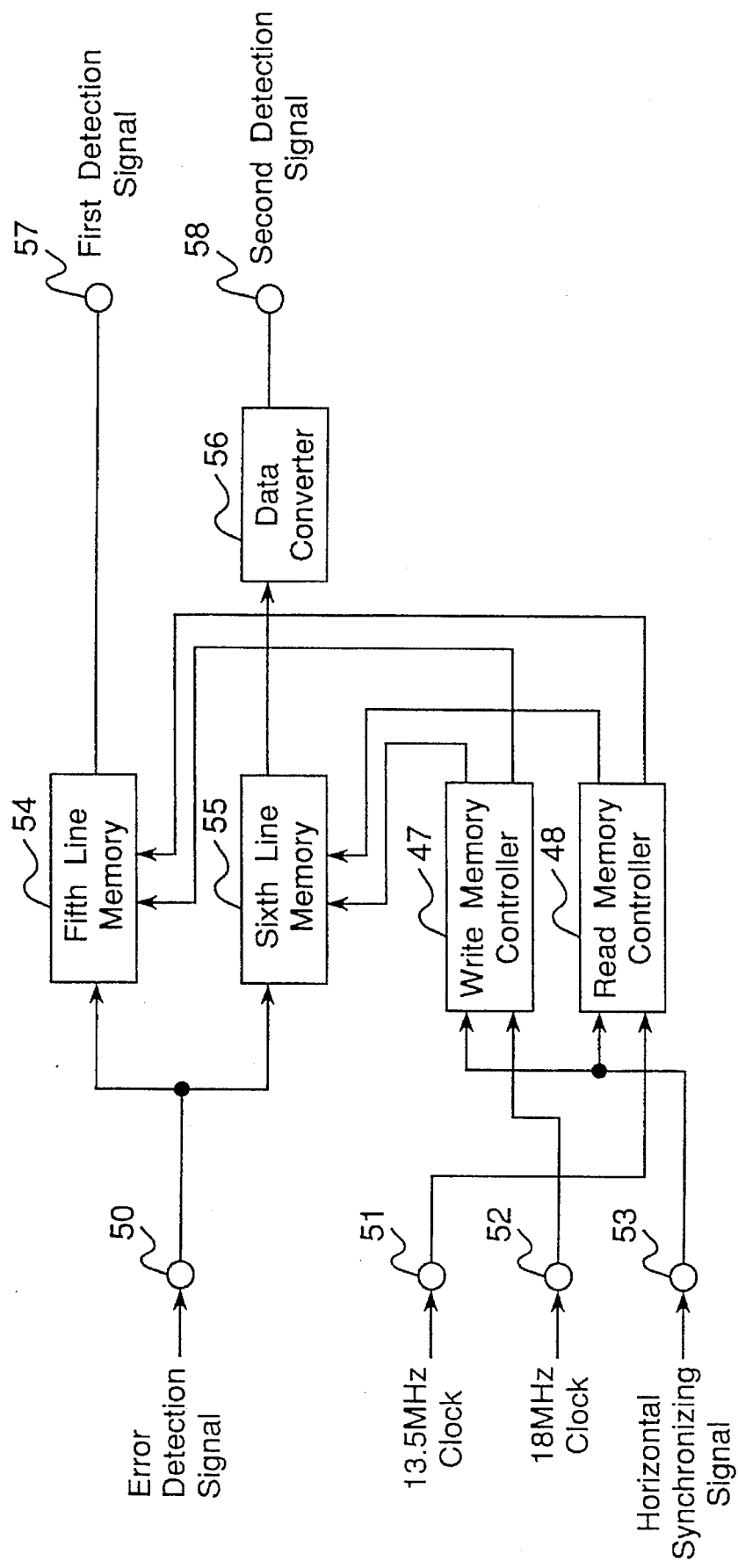
FIG. 11 is a schematic block diagram of an error classifying circuit 9 shown in FIG. 1.

FIG. 11 shows the error classifying circuit 9 shown in FIG. 1.

Referring to FIG. 11, the error classifying circuit 9 comprises;

(a) an input terminal 50 for inputting the error detection signal outputted from the error correction circuit 7;

(b) an input terminal 51 for inputting the 13.5 MHz clock;

(c) an input terminal 52 for inputting the 18.0 MHz clock;

(d) a fifth line memory 54 for storing the error detection signal representing an error position of the higher-order-eight-bit data, the fifth line memory 54 having a memory capacity capable of the two horizontal scanning lines and being constituted in a form of one bit per one address;

(e) a sixth line memory 55 for storing the error detection signal representing an error position of the eight-bit digital video data constituted by combining the four samples of the lower-order-two-bit data, the sixth line memory 55 having a memory capacity capable of the two horizontal scanning lines and being constituted in a form of one bit per one address;

(f) a data converter 56 for, for a time interval of four clocks, holding the level of the error detection signal outputted from the sixth line memory 55 every four clocks;

(g) a write memory controller 47 for generating a write clock signal, a write reset signal and a write enable signal based on the 18.0 MHz clock inputted through the input terminal 52, and the horizontal synchronizing signal inputted through the input terminal 53 so as to control a write operation of the fifth and sixth line memories 54 and 55, and outputting these signals to the fifth and sixth line memories 54 and 55;

(h) a read memory controller 48 for generating a read clock signal, a read reset signal and a read enable signal based on the 13.5 MHz clock inputted through the input terminal 51, and the horizontal synchronizing signal inputted through the input terminal 53 so as to control a read operation of the fifth and sixth line memories 54 and 55, and outputting these signals to the fifth and sixth line memories 54 and 55;

(i) an output terminal 57 for outputting the first detection signal representing the error or the error position of the higher-order-eight-bit data of the ten-bit digital video data combined by the data combining circuit 8; and (j) an output terminal 58 for outputting the first detection signal representing the error or the error position of the lower-order-two-bit data of the ten-bit digital video data combined by the data combining circuit 8.

An operation of the error classifying circuit 9 will be described below with reference to FIG. 11.

Among the error detection signal inputted through the input terminal 50, the error detection signal representing the digital video data of 720 words constituted by the higher-order-eight-bit data is written into the fifth line memory 54, whereas the error detection signal representing the digital video data of 180 words constituted by the lower-order-two-bit data is written into the sixth line memory 55.

The write operation of the error detection signal into the fifth and sixth line memories 54 and 55 is performed in a manner similar to that into the third and fourth line memories 44 and 45 shown in FIG. 8. In this case, data of the first 720 clocks of the effective portion of one horizontal scanning line is written into the fifth line memory 54, and data of the next 180 clocks thereof is written into the sixth line memory 55. Further, the dummy data of the remaining 60 clocks thereof is not written into the fifth and sixth line memories 54 and 55.

The read operation of the error detection signal from the fifth and sixth line memories 54 and 55 is performed by controlling the read enable signals for the fifth and sixth line memories 54 and 55, in a manner similar to that shown in FIG. 10. The error detection signal representing the error or the error position of the high-order-eight-bit data of the effective digital video data of one horizontal scanning line is read out every one clock from the fifth line memory 54, and is outputted as the first error detection signal through the output terminal 57. On the other hand, the error detection signal representing the error or the error position of the lower-order-two-bit data of the effective digital video data of one horizontal scanning line is read out every four clocks from the sixth line memory 55 as the error detection signal of the eight-bit digital video data constituted by combining the four samples of the lower-order-two-bit digital video data, and is outputted to the data converter 56. The data converter 56 holds the level of the input error detection signal for a time interval of four clocks and outputs the error detection signal as the second error detection signal through the output terminal 58.

Figure 12:
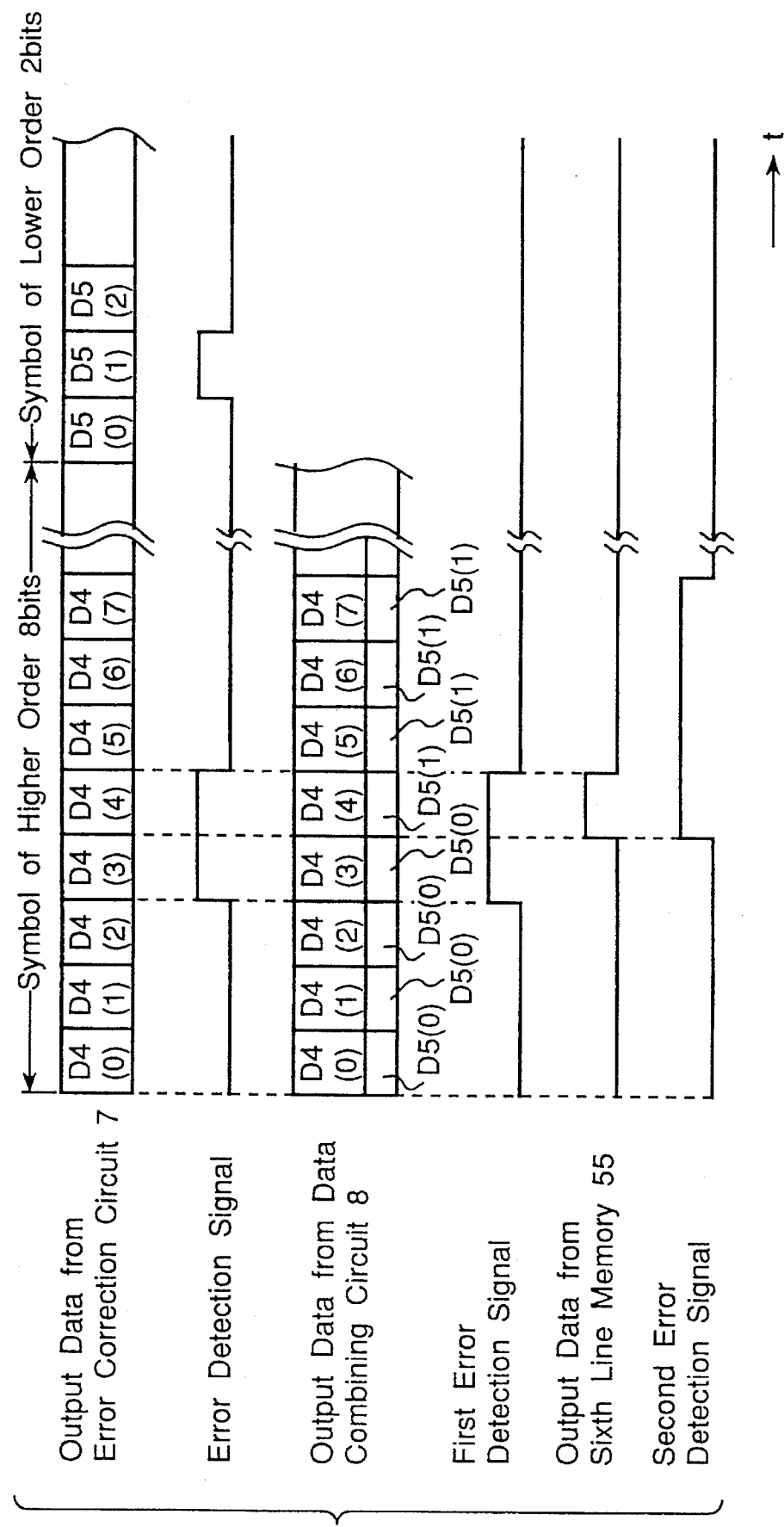
FIG. 12 is a timing chart showing a relationship among an error detection signal, a first error detection signal and a second error detection signal which are used in the error classifying circuit 9 shown in FIG. 11.

FIG. 12 is a timing chart showing the error detection signal, the first error detection signal and the second error detection signal which are used in the error classifying circuit 9 shown in FIG. 11.

As shown in FIG. 12, the error detection signal representing the error or the error position of the higher-order-eight-bit data D4(3) and D4(4) is outputted as the first error detection signal as it is. On the other hand, the error detection signal detected at the position of the lower-order-two-bit digital video data DS(1) outputted from the error correction circuit 7 is converted by the error classifying circuit 9 into the second error detection signal representing the error position or the error of the lower-order-two-bit data of the ten-bit digital video data including the higher-order-eight-bit data D4(4), D4(5), D4(6) and D4(7) outputted from the data combining circuit 8.

Further, the ten-bit digital video data outputted from the data combining circuit 8 and the first error detection signal outputted from the error classifying circuit 9 are inputted to the error concealment circuit 10. The error concealment circuit 10 performs an interpolation process or replacing process based on the peripheral samples of an error sample to be processed, only when the first detection signal having a high level is inputted. In other words, the error concealment circuit 10 performs an error concealment process for the input digital video data by predictively interpolating the input digital video data which could not be corrected by the error correction circuit 7, using the peripheral data thereof.

The feature of the present preferred embodiment is that the second error detection signal representing the error or the error position of the lower-order-two-bit data constituted by four samples is not used for the error concealment because an error of one symbol influences four samples and then enlarges the area of the error concealment range. Further, there is almost no problem even though an error concealment of a ten-bit sample including an error of only lower-order-two-bit data is not performed.

As described above, in the present preferred embodiment, the ten-bit-quantized digital video data is divided into the higher-order-eight-bit data and the lower-order-two-bit data by the data dividing circuit 2, and then the higher-order-eight-bit data is used as one symbol of the error correction code, whereas the four lower-order-two-bit data are packed or combined so as to obtain an eight-bit digital video data, which is used as one symbol of the error correction code. On the other hand, the data combining circuit 8 performs an inverse process to that of the data dividing circuit 2. With respect to a symbol which could not be error-corrected, the error detection signal outputted from the error correction circuit 7 is classified by the error classifying circuit 9 into the first error detection signal representing the error or the error position of the higher-order-eight-bit data and the second error detection signal representing the error or the error position of the lower-order-two-bit data, and then outputs the above-mentioned two kinds of error detection signals including the first and second error detection signals, per one sample of the ten-bit digital video data. Further, the error concealment circuit 10 does not use the second error detection signal, and performs an error concealment process based on only the first error detection signal. In this case, since the second error detection signal represents an error of the four lower-order-two-bit data, when the sample position to be error-concealed is determined by the second error detection signal, an error of four samples may be concealed based on an error of one symbol. Therefore, in the present preferred embodiment, as described above, the error detection signal is classified into the first error detection signal representing an error of the higher-order-eight-bit data and the second error detection signal representing an error of the lower-order-two-bit data, and the sample position to be error-concealed is determined based on only the first error detection signal representing the error of the higher-order-eight-bit data. As a result, the error of the lower-order-two-bit data is prevented from propagating or leading to the high-order-eight-bit data, and then an error concealment can be performed with a performance or improvement higher than that of the conventional digital VTR.

In the present preferred embodiment, the error classifying circuit 9 comprises the sixth line memory 55 and the data converter 56, however, the present invention is not limited to this. The error classifying circuit 9 may not comprise the sixth line memory 55 and the data converter 56.

Further, the composition and operation of the data combining circuit 10 are similar to those of the error classifying circuit 9. Therefore, the data combining circuit 8 and the error classifying circuit 9 may be combined into one circuit by using nine-bit digital video data including the eight-bit digital video data inputted to the data combining circuit 8 and the one-bit error detection signal. This results in decrease in the circuit size.

Furthermore, in the present preferred embodiment, the digital VTR for recording and reproducing the digital video data, however, the present invention is not limited to this. The present invention can be applied to only the apparatus for reproducing the digital video data. Further, the present invention may be an apparatus for transmitting and receiving the digital video data (referred to as a data transmission apparatus hereinafter) shown in FIG. 13, such as a digital video data transceiver, a digital video data transmitter or a digital video data receiver.

Figure 13:
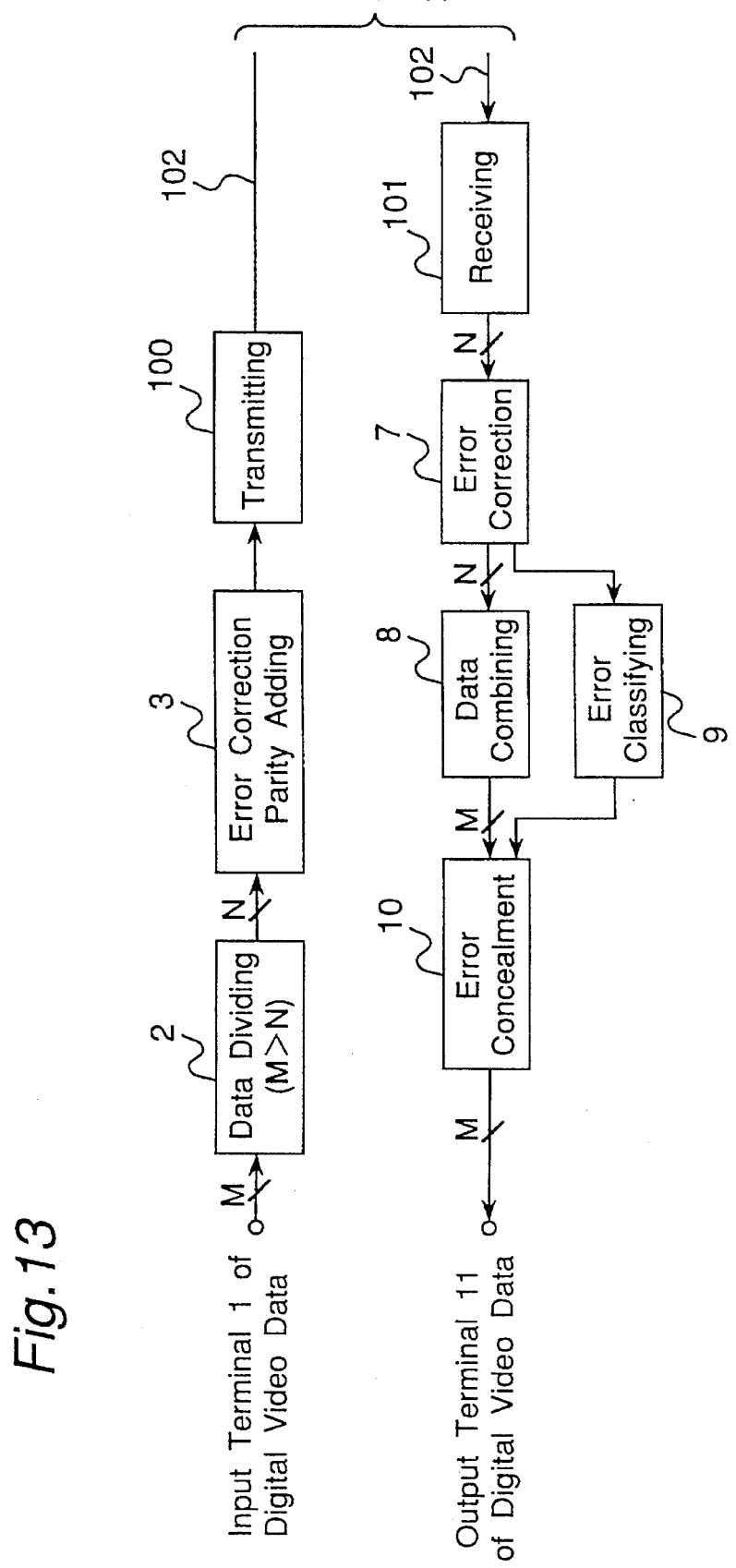
FIG. 13 is a schematic block diagram of an apparatus for transmitting and receiving digital video data according to another preferred embodiment of the present invention.
Figure 14:
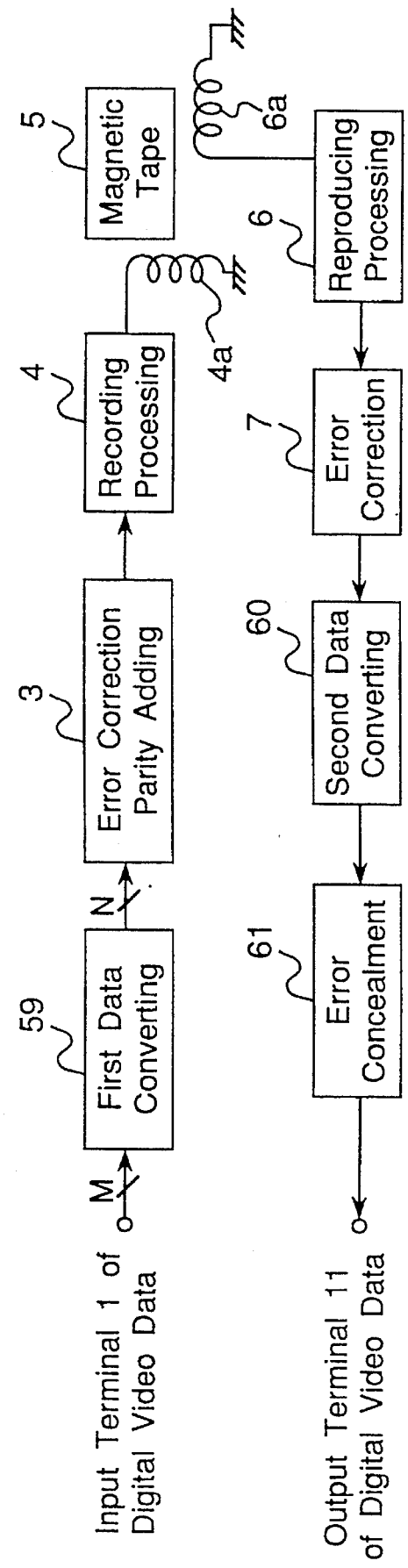
FIG. 14 is a schematic block diagram of a conventional digital VTR for recording and reproducing digital video data.

In the data transmission apparatus shown in FIG. 13, as is apparent from comparison between FIGS. 1 and 13, a transmitting circuit 100 and a receiving circuit 101 are provided in stead of the recording processing circuit 4 and recording magnetic head 4a, and the reproducing processing circuit 6 and the reproducing magnetic head 6a, respectively. The transmitting circuit 100 transmits eight-bit digital video data to a predetermined destination station through a communication line 102 such as an ISDN (Integrated Services Digital Network) line or the like, and the receiving circuit 101 receives the eight-bit digital video data sent from the destination station through the communication line.

In the present preferred embodiment, the magnetic tape 5 is used as a recording medium, however, the present invention is not limited to this. As the recording medium, a magnetic disk, an opto-magnetic disk or the like may be used.

In the present preferred embodiment, M=10 and N=8, however, the present invention is not limited to this. "M" may be a predetermined natural number, and "N" may be a predetermined natural number smaller than the natural number "M". Further, the natural number "N" may be preferably a multiple of the natural number (M−N). If the natural number "N" is not any multiple of the natural number (M−N), it is necessary to insert dummy data into the combined lower-order-bit data so as to obtain the total N-bit data.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An apparatus for processing input N-bit digital video data with an error correction parity, said input N-bit digital video data including each one sample of higher-order-N-bit data and a plurality of samples of lower-order-(M−N)-bit data, M being a predetermined natural number, N being a predetermined natural number smaller than the natural number M, said apparatus comprising:

error correction means for correcting an error of said input N-bit digital video data, outputting error-corrected N-bit digital video data, and generating and outputting an error detection signal representing an error which can not be corrected;

data combining means for converting said error-corrected N-bit digital video data outputted from said error correction means into M-bit digital video data by combining said each one sample of said higher-order-N-bit data and said plurality of samples of said lower-order-(M−N)-bit data included in said error-corrected N-bit digital video data so as to obtain said M-bit digital video data, and outputting converted M-bit digital video data;

error classifying means for classifying said error detection signal into a first error detection signal representing an error of said each one sample of said higher-order-N-bit data and a second error detection signal representing an error of said plurality of samples of said lower-order-(M−N)-bit data; and error concealment means for performing an error concealment process for said converted M-bit digital video data outputted from said data combining means based on said first error detection signal outputted from said error classifying means.

2. The apparatus as claimed in claim 1, wherein said error classifying means comprises:

line memory means for storing said error detection signal outputted from said error correction means, said line memory means having a memory capacity for storing said error detection signal of two horizontal scanning line;

write memory control means for controlling said line memory means so as to write said error detection signal representing an error of said high-order-N-bit data into said line memory means;

read memory control means for controlling said line memory means so as to read out and output said error detection signal as said first error detection signal.

3. The apparatus as claimed in claim 1, wherein said natural number N is a multiple of a natural number (M−N).

4. An apparatus for recording and reproducing digital video data, comprising:

data dividing means for dividing each sample of input M-bit digital video data into high-order-N-bit data and lower-order-(M−N)-bit data, constituting each one sample of said higher-order-N-bit data as one symbol of a predetermined error correction code, constituting a plurality of samples of said lower-order-(M−N)-bit data as one symbol of the error correction code, and outputting N-bit digital video data including said each one sample of the higher-order-N-bit data and said plurality of samples of the lower-order-(M–N)-bit data, M being a predetermined natural number, N being a predetermined natural number smaller than the natural number M;

parity adding means for adding an error correction parity to said N-bit digital video data outputted from said data dividing means, and outputting said N-bit digital video data with said error correction parity;

recording means for recording said N-bit digital video data with said error correction parity outputted from said parity adding means, onto a recording medium;

reproducing means for reproducing said N-bit digital video data with said error correction parity recorded on said recording medium;

error correction means for correcting an error of said N-bit digital video data outputted from said reproducing means, outputting error-corrected N-bit digital video data, and generating and outputting an error detection signal representing an error which can not be corrected;

data combining means for converting said error-corrected N-bit digital video data outputted from said error correction means into M-bit digital video data by combining said each one sample of said higher-order-N-bit data and said plurality of samples of said lower-order-(M–N)-bit data included in said error-corrected N-bit digital video data so as to obtain said M-bit digital video data, and outputting converted M-bit digital video data;

error classifying means for classifying said error detection signal into a first error detection signal representing an error of said each one sample of said higher-order-N-bit data and a second error detection signal representing an error of said plurality of samples of said lower-order-(M–N)-bit data; and error concealment means for performing an error concealment process for said converted M-bit digital video data outputted from said data combining means based on said first error detection signal outputted from said error classifying means.

5. The apparatus as claimed in claim 4, wherein said error classifying means comprises:
line memory means for storing said error detection signal outputted from said error correction means, said line memory means having a memory capacity for storing said error detection signal of two horizontal scanning line;

write memory control means for controlling said line memory means so as to write said error detection signal representing an error of said high-order-N-bit data into said line memory means;

read memory control means for controlling said line memory means so as to read out and output said error detection signal as said first error detection signal.

6. The apparatus as claimed in claim 4, wherein said natural number N is a multiple of a natural number (M–N).

7. An apparatus for reproducing N-bit digital video data with an error correction parity recorded on a recording medium, said N-bit digital video data including each one sample of higher-order-N-bit data and a plurality of samples of lower-order-(M–N)-bit data, M being a predetermined natural number, N being a predetermined natural number smaller than the natural number M, said apparatus comprising:

reproducing means for reproducing said N-bit digital video data with said error correction parity recorded on said recording medium;

error correction means for correcting an error of said N-bit digital video data outputted from said reproducing means, outputting error-corrected N-bit digital video data, and generating and outputting an error detection signal representing an error which can not be corrected;

data combining means for converting said error-corrected N-bit digital video data outputted from said error correction means into M-bit digital video data by combining said each one sample of said higher-order-N-bit data and said plurality of samples of said lower-order-(M–N)-bit data included in said error-corrected N-bit digital video data so as to obtain said M-bit digital video data, and outputting converted M-bit digital video data;

error classifying means for classifying said error detection signal into a first error detection signal representing an error of said each one sample of said higher-order-N-bit data and a second error detection signal representing an error of said plurality of samples of said lower-order-(M–N)-bit data; and error concealment means for performing an error concealment process for said converted M-bit digital video data outputted from said data combining means based on said first error detection signal outputted from said error classifying means.

8. The apparatus as claimed in claim 7, wherein said error classifying means comprises:
line memory means for storing said error detection signal outputted from said error correction means, said line memory means having a memory capacity for storing said error detection signal of two horizontal scanning line;

write memory control means for controlling said line memory means so as to write said error detection signal representing an error of said high-order-N-bit data into said line memory means;

read memory control means for controlling said line memory means so as to read out and output said error detection signal as said first error detection signal.

9. The apparatus as claimed in claim 7, wherein said natural number N is a multiple of a natural number (M–N).

10. An apparatus for transmitting and receiving digital video data, comprising:

data dividing means for dividing each sample of input M-bit digital video data into high-order-N-bit data and lower-order-(M–N)-bit data, constituting each one sample of said higher-order-N-bit data as one symbol of a predetermined error correction code, constituting a plurality of samples of said lower-order-(M–N)-bit data as one symbol of the error correction code, and outputting N-bit digital video data including said each one sample of the higher-order-N-bit data and said plurality of samples of the lower-order-(M–N)-bit data, M being a predetermined natural number, N being a predetermined natural number smaller than the natural number M;

parity adding means for adding an error correction parity to said N-bit digital video data outputted from said data dividing means, and outputting said N-bit digital video data with said error correction parity;

transmitting means for transmitting said N-bit digital video data with said error correction parity outputted from said parity adding means, to a predetermined destination station;

receiving means for receiving said N-bit digital video data with said error correction parity from said destination station;

error correction means for correcting an error of said N-bit digital video data outputted from said receiving means, outputting error-corrected N-bit digital video data, and generating and outputting an error detection signal representing an error which can not be corrected;

data combining means for converting said error-corrected N-bit digital video data outputted from said error correction means into M-bit digital video data by combining said each one sample of said higher-order-N-bit data and said plurality of samples of said lower-order-(M–N) -bit data included in said error-corrected N-bit digital video data so as to obtain said M-bit digital video data, and outputting converted M-bit digital video data;

error classifying means for classifying said error detection signal into a first error detection signal representing an error of said each one sample of said higher-order-N-bit data and a second error detection signal representing an error of said plurality of samples of said lower-order-(M–N)-bit data; and error concealment means for performing an error concealment process for said converted M-bit digital video data outputted from said data combining means based on said first error detection signal outputted from said error classifying means.

11. The apparatus as claimed in claim 10, wherein said error classifying means comprises:

line memory means for storing said error detection signal outputted from said error correction means, said line memory means having a memory capacity for storing said error detection signal of two horizontal scanning line;

write memory control means for controlling said line memory means so as to write said error detection signal representing an error of said high-order-N-bit data into said line memory means;

read memory control means for controlling said line memory means so as to read out and output said error detection signal as said first error detection signal.

12. The apparatus as claimed in claim 10, wherein said natural number N is a multiple of a natural number (M–N).

13. An apparatus for receiving N-bit digital video data with an error correction parity from a predetermined destination station, said N-bit digital video data including each one sample of higher-order-N-bit data and a plurality of samples of lower-order-(M–N)-bit data, M being a predetermined natural number, N being a predetermined natural number smaller than the natural number M, said apparatus comprising:

receiving means for receiving said N-bit digital video data with said error correction parity from said destination station;

error correction means for correcting an error of said N-bit digital video data outputted from said receiving means, outputting error-corrected N-bit digital video data, and generating and outputting an error detection signal representing an error which can not be corrected;

data combining means for converting said error-corrected N-bit digital video data outputted from said error correction means into M-bit digital video data by combining said each one sample of said higher-order-N-bit data and said plurality of samples of said lower-order-(M–N) -bit data included in said error-corrected N-bit digital video data so as to obtain said M-bit digital video data, and outputting converted M-bit digital video data;

error classifying means for classifying said error detection signal into a first error detection signal representing an error of said each one sample of said higher-order-N-bit data and a second error detection signal representing an error of said plurality of samples of said lower-order-(M–N)-bit data; and error concealment means for performing an error concealment process for said converted M-bit digital video data outputted from said data combining means based on said first error detection signal outputted from said error classifying means.

14. The apparatus as claimed in claim 13, wherein said error classifying means comprises:

line memory means for storing said error detection signal outputted from said error correction means, said line memory means having a memory capacity for storing said error detection signal of two horizontal scanning line;

write memory control means for controlling said line memory means so as to write said error detection signal representing an error of said high-order-N-bit data into said line memory means;

read memory control means for controlling said line memory means so as to read out and output said error detection signal as said first error detection signal.

15. The apparatus as claimed in claim 13, wherein said natural number N is a multiple of a natural number (M–N).

\* \* \* \* \*

UNITED STATES PATENT AND TRADEMARK OFFICE
CERTIFICATE OF CORRECTION

PATENT NO. : 5,587,807
DATED : December 24, 1996
INVENTOR(S) : Takeshi OOTSUKA et al.

It is certified that error appears in the above-indentified patent and that said Letters Patent is hereby corrected as shown below:

Col. 18, line 50, after ";" add --and--.
Col. 19, line 52, after ";" add --and--.
Col. 20, line 40, after ";" add --and--.
Col. 21, line 43, after ";" add --and--.
Col. 22, line 45, after ";" add --and--.

Signed and Sealed this

Twenty-eighth Day of April, 1998

Attest:

BRUCE LEHMAN

Attesting Officer

Commissioner of Patents and Trademarks